United States Patent
Zhou et al.

(10) Patent No.: US 8,463,889 B2
(45) Date of Patent: Jun. 11, 2013

(54) METHOD FOR PROVISIONING AND INSTALLING EVENT TRIGGERS

(75) Inventors: Xiaoyun Zhou, Shenzhen (CN); Zaifeng Zong, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 187 days.

(21) Appl. No.: 13/003,972

(22) PCT Filed: Dec. 16, 2008

(86) PCT No.: PCT/CN2008/073524
§ 371 (c)(1), (2), (4) Date: Feb. 11, 2011

(87) PCT Pub. No.: WO2010/006491
PCT Pub. Date: Jan. 21, 2010

(65) Prior Publication Data
US 2011/0131313 A1    Jun. 2, 2011

(30) Foreign Application Priority Data

Jul. 17, 2008  (CN) .......................... 2008 1 0130758

(51) Int. Cl.
*G06F 15/173* (2006.01)
(52) U.S. Cl.
USPC ........... 709/223; 370/230; 370/235; 370/252; 370/328; 370/331
(58) Field of Classification Search
USPC .......... 370/230, 235, 252, 328, 331; 709/223, 709/227, 228
See application file for complete search history.

(56) References Cited

FOREIGN PATENT DOCUMENTS

| CN | 101060413 A | 10/2007 |
|---|---|---|
| CN | 101217789 A | 7/2008 |
| WO | 2007097670 A1 | 8/2007 |

OTHER PUBLICATIONS

3rd Generation Partnership Project (3GPP), "Technical Specification Group Services and System Aspects; Policy and charging control architecture", v8.2.0, Jun. 2008, pp. 107.*
3rd Generation Partnership Project (3GPP), "Technical Specification Group Services and System Aspects; Architecture enhancements for non-3GPP accesses", v8.1.1, Mar. 2008, pp. 163.*
Notification of the First Office Action of Chinese application No. 200810130758.1, issued on Jun. 9, 2010.
International Search Report dated Apr. 30, 2009 corresponding to International Patent Application No. PCT/CN2008/073524 and English translation thereof, 4 pages.
English Translation of the Written Opinion of the International Search Authority in international applicatin No. PCT/CN2008/073524, mailed on Apr. 30, 2009.
Policy and Charging Control over Gx reference point May 1, 2008.
Supplementary European Search Report in European application No. 08876569.8, mailed on Jun. 4, 2012.

* cited by examiner

*Primary Examiner* — Andrew Chriss
*Assistant Examiner* — Peter Mak
(74) *Attorney, Agent, or Firm* — Oppedahl Patent Law Firm LLC

(57) ABSTRACT

The present invention provides a method for provisioning and installing event triggers, which is applied to an evolved packet system. The method comprises: a policy and charging rules function entity provisions event triggers to a bearer binding and event reporting function entity based on gateway control session level; after receiving the provisioned event triggers, the BBERF installs or updates the event triggers. An evolved packet system is further provided.

10 Claims, 6 Drawing Sheets

METHOD FOR PROVISIONING AND INSTALLING EVENT TRIGGERS

RELATED APPLICATIONS

This is the U.S. national stage application which claims priority, under 35 U.S.C. §119, to International Patent Application No.: PCT/CN2008/073524, filed on Dec. 16, 2008, which claims priority to Chinese Patent Application No.: 200810130758.1, filed Jul. 17, 2008, the disclosures of which are incorporated by reference herein in its entirety.

TECHNICAL FIELD

The present invention relates to a 3GPP (3rd Generation Partnership Project) EPS (Evolved Packet System), particularly to a method for provisioning and installing event triggers in the system.

BACKGROUND

As shown in FIG. 1, the 3GPP EPS comprises an E-UTRAN (Evolved Universal Terrestrial Radio Access Network), an MME (Mobility Management Entity), an S-GW (Serving Gateway), a P-GW (Packet Data Network Gateway), an HSS (Home Subscriber Server), a 3GPP AAA server (3GPP Authentication, Authorization, and Accounting server), a PCRF (Policy and Charging Rules Function entity) and other support nodes. Wherein the S-GW is an access gateway device in connection with the E-UTRAN, used for forwarding data between the E-UTRAN and the P-GW, and responsible for caching call waiting data; the P-GW is a border gateway between the EPS and a PDN (Packet is Data Network), and responsible for accessing the PDN and forwarding data between the EPS and the PDN, etc.; and the PCRF is connected to an operator's IP (Internet Protocol) service network through an Rx interface to obtain service information.

The EPS supports intercommunication with a non-3GPP network. The intercommunication with the non-3GPP network is implemented through an S2a, S2b, or S2c interface, while the P-GW is used as an anchor point between the 3GPP network and the non-3GPP network. The non-3GPP network is categorized into a trusted non-3GPP network and an untrusted non-3GPP network. The IP access of the trusted non-3GPP network may be connected to the P-GW directly via the S2a interface; the IP access of the untrusted non-3GPP network needs to be connected to the P-GW via an ePDG (evolved packet data gateway), and the interface between the ePDG and the P-GW is S2b. A UE (User Equipment) may also be connected to the P-GW directly via the S2c interface according to a DSMIPv6 (Dual Stack Mobile Ipv6).

In the EPS system, a PCEF (Policy and Charging Enforcement Function entity) resides in the P-GW, and the PCRF and the P-GW exchange information via a Gx interface. When the interface between the P-GW and the S-GW is based on a PMIPv6, the S-GW also has policy control function, which is called BBERF (Bearer Binding and Event Reporting Function entity), and the S-GW and the PCRF exchange information via a Gxc interface. When the UE accesses the EPS through the trusted non-3GPP network, the BBERF also exists in the trusted non-3GPP access network, and the trusted non-3GPP network access gateway and the PCRF exchange information via a Gxa interface. An AF (Application Function) providing service for the UE sends service information for setting a PCC (Policy and Charging Control) or Qos (Quality of Service) policy to the PCRF via the Rx interface.

An MIPv6 (Mobile IPv6) supports the accessibility and continuity of sessions while an MN (Mobile Node) moves in the network by binding an IPv6 care-of address (CoA) and an IPv6 home address (HoA) of the MN. However, since the IPv6 network has not been deployed widely, the IPv4 network will still be prevalent for a long term in the future. The MN in the IPv6 network always moves to a network not supporting IPv6, thus it is compulsory to expand the MIPv6. An effective solution is the DSMIPv6, which is a client-based MIP and requires both the MN and home agent to support the DSMIPv6. In the EPS system, the P-GW supports the home agent function. The MN supporting the DSMIPv6 supports mobility over the IPv4 or IPv6 network by binding the IPv4/IPv6 CoA and IPv4/IPv6 HoA.

The EPS system supports multi-PDN access, i.e., the UE may access multiple PDNs simultaneously via multiple P-GWs or one P-GW. FIG. 2 shows a scenario of a UE accessing two PDNs simultaneously through two P-GWs according to the DSMIPv6.

FIG. 3 shows a flow chart of a UE initiating attachment to and accessing two PDNs based on the scenario in FIG. 2, specific steps are as follows.

Step 301: a UE accesses a trusted non-3GPP access network via layer 2, and an HSS/AAA performs access authentication and authorization to the UE.

Step 302: after the authentication is successful, a connection of the UE to layer 3 of the trusted non-3GPP access system is established, and the trusted non-3GPP access system assigns an IP address to the UE as a CoA of the UE.

Step 303: the trusted non-3GPP access network sends a gateway control session establishment request message to a PCRF, and the message includes an NAI (Network Access Identifier) of the UE and the CoA of the UE.

Step 304: the PCRF sets a control policy based on a network policy and subscription information of the UE, i.e., a QoS rule, and provisions it to a BBERF in the trusted non-3GPP access network through an acknowledge gateway control session establishment message, and the control policy here has no relation to the service which the UE is about to access.

Step 305: the UE queries a DNS (Domain Name Server) according to an APN1 (Access Point Name) to obtain an IP address of a P-GW1 capable of accessing a first service network, and a security association is established between the UE and the P-GW1, during this process the P-GW1 assigns an HoA1 to the UE.

Step 306: the UE sends a binding update request message to the P-GW1, and the message includes the CoA and the HoA1.

Step 307: the P-GW1 sends indication of an IP-CAN (IP Connectivity Access Network) session establishment message to the PCRF, and the message includes the CoA, HoA1, NAI and APN1; and the PCRF associates the IP-CAN session with the gateway control session according to the CoA.

Step 308: the PCRF, according to the network policy, user subscription information and information about the first service network to be accessed, etc., sets a corresponding PCC rule and event triggers, and sends them to the P-GW1 via an acknowledge IP-CAN session establishment message.

Step 309: a PCEF in the P-GW1 installs the PCC rule and the event triggers provisioned by the PCRF, and returns a binding acknowledgement message to the UE.

Step 310: the PCRF, according to the network policy, the user subscription information and the information about the first service network to be accessed, etc., sets a QoS rule; if this QoS rule is different from the QoS rule set in step 304, QoS rule is updated, and the new QoS rule is provisioned to the BBERF in the trusted non-3GPP access network through a gateway control and QoS rule provision message; the PCRF also sets event triggers and sends them to the BBERF via the gateway control and QoS rule provision message.

Step 311: the BBERF in the trusted non-3GPP access network installs the received event triggers, and returns an acknowledge gateway control and QoS rule provision message to the PCRF.

If the updated QoS rule is provisioned, the BBERF also needs to update the installed QoS rule.

Till now, the UE attachment flow is complete, and an IP-CAN session to a PDN1 is established.

Step 312: because of service requirement, the UE determines to access a second service network, and queries the DNS according to an APN2 to obtain an IP address of a P-GW2 capable of accessing the second service network.

Step 313: a security association is established between the UE and the P-GW2, during this process the P-GW2 assigns an HoA2 to the UE.

Step 314: the UE sends a binding update request message to the P-GW2, and the message includes the CoA and the HoA2.

Step 315: the P-GW2 sends an indication of IP-CAN session establishment message to the PCRF, and the message includes the CoA, HoA2, NAI and APN2; and the PCRF associates the IP-CAN session with the gateway control session according to the CoA.

Step 316: the PCRF, according to the network policy, user subscription information and information about the second service network to be accessed, etc., sets a corresponding PCC rule and event triggers, and sends them to the P-GW2 via an acknowledge IP-CAN session establishment message.

Step 317: a PCEF in the P-GW2 installs the PCC rule and the event triggers provisioned by the PCRF, and returns a binding acknowledgement message to the UE.

Step 318: the PCRF, according to the network policy, the user subscription information and the information about the second service network to be accessed, etc., sets a QoS rule and event triggers, and provisions them to the BBERF in the trusted non-3GPP access network through a gateway control and QoS rule provision message.

Step 319: the BBERF in the trusted non-3GPP access network installs the received QoS rule and the event triggers, and returns an acknowledge gateway control and QoS rule provision message to the PCRF.

Through the above-mentioned flow, the UE establishes IP connection to the first service network and IP connection to second service network, respectively. This IP connection from the UE to the service network is called IP-CAN. For the convenience of description, hereinafter, the IP connection from the UE to the first service network is called a first IP-CAN session, and the IP connection from the UE to the second service network is called a second IP-CAN session. The PCRF always stores the latest PCC rule, QoS rule and event triggers for each IP-CAN session related to the UE. According to a UE identification included in an IP-CAN, it may be determined that this IP-CAN session is an IP-CAN session related to the UE. Both the IP-CAN session and the gateway control session are implemented by a diameter session when they are between these network elements. A diameter session established between the PCRF and the trusted non-3GPP access network is called a gateway control session, or a Gxx session (in the prior art, this connection is established according to a diameter protocol, and the context of the diameter session is stored in the PCRF and the trusted non-3GPP access network). A diameter session established between the P-GW1 and the PCRF or between the P-GW2 and the PCRF, is called a Gx session.

The PCRF provisions the QoS rule and the event triggers, which are used to perform policy and charging control to the first IP-CAN session, to the BBERF in the trusted non-3GPP access network through the Gxx session between the trusted is non-3GPP access network and the PCRF; and it provisions the PCC rule and the event triggers, which are used to perform policy and charging control to the first IP-CAN session, to the PCEF in the P-GW1 through the Gx session between the P-GW1 and the PCRF. Likewise, the PCRF provisions the QoS rule and the event triggers, which are used to perform policy and charging control to the second IP-CAN session, to the BBERF in the trusted non-3GPP access network through the Gxx session between the trusted non-3GPP access network and the PCRF; and it provisions the PCC rule and the event triggers, which are used to perform policy and charging control to the second IP-CAN session, to the PCEF in the P-GW2 through the Gx session between the P-GW2 and the PCRF.

However, if the event triggers are provisioned according to the above-mentioned flow, the BBERF cannot correctly report trigger events customized by the event triggers.

SUMMARY

The technical problem to be solved by the present invention is to provide a method for provisioning and installing event triggers, when a UE has multiple IP-CAN sessions and adopts a DSMIPv6, a BBERF can correctly report trigger events so as to perform correct policy control to the service data flow.

Firstly, through an in-depth analysis on the prior art flow, the applicant determines causes for potential event misreporting. Relevant analysis is specified below.

The Gx session between the P-GW and the PCRF has a one-to-one correspondence to the IP-CAN session. When the PCRF sends policy information to the P-GW via the Gx session, the P-GW can determine with which IP-CAN session the policy information is associated. However, the Gxx session between the trusted non-3GPP access network and the PCRF has a one-to-many correspondence to the IP-CAN session. When the PCRF provisions policy information to the BBERF in the trusted non-3GPP access network through the Gxx session, the trusted non-3GPP access network cannot determine with which IP-CAN the policy information is associated.

The event triggers are set by the PCRF and provided to the PCEF or the BBERF for installation. The PCRF may provide one or more event triggers simultaneously to the PCEF or the BBERF. When the IP-CAN session changes, the PCEF or the BBERF determines whether the change needs to be reported to the PCRF according to the is event triggers. When the change satisfies the event triggers, the PCEF or the BBERF will report the occurring event and the affected PCC or QoS rule to the PCRF and request the PCRF to provision a new PCC or QoS rule. The PCRF may add event triggers into or delete event triggers from the event triggers which have been provisioned to the PCEF or the BBERF at any time. In order to achieve this objective, the PCRF must provision a list of all event triggers, rather than only provisioning the event triggers to be added or deleted. In the prior art, all of the above operations are based on IP-CAN session level, i.e., when an event change happens to an IP-CAN session, the PCRF sets new event triggers and provisions a list of all event triggers of the IP-CAN session to the PCEF or the BBERF. The PCEF or the BBERF deletes the previously installed event triggers and installs the newly provisioned event triggers.

However, in the scenario as shown in FIG. 3, in step 310 the PCRF sends first event triggers related to the first IP-CAN session to the BBERF for installation. Further, in step 318 the PCRF sends second event triggers related to the second IP-CAN session to the BBERF. The BBERF will determine the second event triggers as an update on the first event triggers, thus the BBERF will delete the first event triggers and then install the second event triggers. If the first event triggers and the second event triggers are not completely identical, the BBERF will not report events which are customized in the first event triggers but not customized in the second event triggers. Thus, in the prior art, when establishing an IP connectivity access session or updating event triggers after establishing the IP connectivity access session, a cause for an error lies in: since a Gxx session between the BBERF and PCRF is used for transmitting policy control information related to multiple IP-CAN sessions (i.e., multiple IP-CAN sessions share one gateway control session), when the BBERF or the PCRF receives new event triggers from the counterpart, it cannot determine to which IP-CAN session these event triggers are related, and then it performs a wrong update so as to cause event misreporting. In other words, if the PCRF provisions event triggers to the BBERF by still using the method based on the IP-CAN session level in the prior art, the BBERF would be unable to report trigger events correctly.

In order to solve the above-mentioned problem, the present invention provides a method for provisioning and installing event triggers, which is applied to an evolved packet system, and the method comprises:

a PCRF provisions event triggers to a BBERF based on gateway control session is level;

after receiving the provisioned event triggers, the BBERF installs or updates the event triggers.

Further, the above-mentioned method for provisioning and installing event triggers may further have the following characteristics:

the event triggers comprise all event triggers of all IP-CAN sessions of a user equipment, which share the gateway control session.

Further, the above-mentioned method for provisioning and installing event triggers may further have the following characteristics:

before the PCRF provisions the event triggers to the BBERF, the method further comprises: the user equipment interacts with a P-GW according to a DSMIPv6, and accesses different service networks through different P-GWs or one P-GW.

Further, the above-mentioned method for provisioning and installing event triggers may further have the following characteristics:

when the user equipment performs attachment, the PCRF sets event triggers for a first IP-CAN session of the user equipment and provisions them to the BBERF; and after the user equipment attachment is complete and when a new IP-CAN session is established, the PCRF sets event triggers for the newly established IP-CAN session, and merges the newly set event triggers with event triggers of other IP-CAN sessions related to the user equipment to form merged event triggers comprising all event triggers of each IP-CAN session related to the user equipment, and then provisions the merged event triggers to the BBERF.

Further, the above-mentioned method for provisioning and installing event triggers may further have the following characteristics:

when the user equipment performs attachment, the PCRF set event triggers for a first IP-CAN session of the user equipment and provisions them to the BBERF;

after the user equipment attachment is complete and when a new IP-CAN session is established, the PCRF sets event triggers for the newly established IP-CAN session, and then determines whether event triggers in the newly set event triggers are all included in is event triggers of other IP-CAN sessions related to the user equipment; if yes, the PCRF need not provision the event triggers to the BBERF; if no, the PCRF merges the newly set event triggers with event triggers of other IP-CAN sessions related to the user equipment to form merged event triggers comprising all event triggers of each IP-CAN session related to the user equipment, and then provisions the merged event triggers to the BBERF.

Further, the above-mentioned method for provisioning and installing event triggers may further have the following characteristics:

after updating event triggers of an IP-CAN session of the user equipment, the PCRF merges the updated event triggers with event triggers of other IP-CAN sessions related to the user equipment to form merged event triggers comprising all event triggers of each IP-CAN session related to the user equipment, and provisions the merged event triggers to the BBERF.

Further, the above-mentioned method for provisioning and installing event triggers may further have the following characteristics:

after updating event triggers of an IP-CAN session of the user equipment, the PCRF firstly determines whether event triggers in the updated event triggers are all included in event triggers of other IP-CAN sessions related to the user equipment; if yes, the PCRF need not provision the event triggers to the BBERF; if no, the PCRF merges the updated event triggers with event triggers of other IP-CAN sessions related to the user equipment to form merged event triggers comprising all event triggers of each IP-CAN session related to the user equipment, and then provisions the merged event triggers to the BBERF.

Further, the above-mentioned method for provisioning and installing event triggers may further have the following characteristics:

when the PCRF needs to update policy control information of an IP-CAN session of the user equipment, it updates event triggers of the IP-CAN session; and/or when the PCRF receives a new resource request for an IP-CAN initiated by the user equipment, it updates event triggers of the IP-CAN session.

Further, the above-mentioned method for provisioning and installing event triggers may further have the following characteristics:

the BBERF is a BBERF in a trusted non-3GPP access network or in an ePDG.

In order to solve the above-mentioned problem, the present invention further provides an evolved packet system which comprises a PCRF and a BBERF, wherein the PCRF is used for setting all event trigger information of each IP-CAN session related to a user equipment into event triggers, each time the PCRF provisions the event triggers to the BBERF;

the BBERF is used for installing or updating the event triggers after receiving the provisioned event triggers.

Further, the above-mentioned evolved packet system may further have the following characteristics:

after setting and provisioning first event triggers for the user equipment and when setting new event triggers, the PCRF directly merges each event trigger related to the user equipment to form merged event triggers comprising all event triggers of each IP-CAN session related to the user equipment, and then provisions the merged event triggers to the BBERF; or when setting new event triggers, the PCRF firstly determines whether event triggers in the newly set event triggers are all included in event triggers of other IP-CAN sessions related to the user equipment; if no, the operations of merging and provisioning are further performed; and if yes, it is unnecessary to provision the event triggers.

Further, the above-mentioned evolved packet system may further have the following characteristics:

after updating event triggers of an IP-CAN session of the user equipment, the PCRF directly merges the updated event triggers with event triggers of other IP-CAN sessions related to the user equipment to form merged event triggers comprising all event triggers of each IP-CAN session related to the user equipment, and then provisions the merged event triggers to the BBERF; or after updating the event triggers, the PCRF firstly determines whether the event triggers in the updated event triggers are all included in event triggers of other IP-CAN sessions related to the user equipment; if no, the operations of merging and provisioning are further performed; and if yes, it is unnecessary to provision the event triggers.

Further, the above-mentioned evolved packet system may further have the following is characteristics:

the PCRF sets event triggers for an IP-CAN session which is from the user equipment to each service network, saves and updates it;

the BBERF is a BBERF in a trusted non-3GPP access network or in an ePDG.

An advantage of the present invention is that when the UE establishes IP connections with multiple service networks simultaneously and interacts with the P-GW according to the DSMIPv6, there are multiple IP-CAN sessions in the network, the PCRF sends all event triggers of a gateway control session related to the UE (i.e., all event triggers of each IP-CAN session related to the UE) to the BBERF. In this way, because avoiding omission of installing event triggers set for an IP-CAN session, the BBERF will not incorrectly report trigger events customized by the event triggers.

DETAILED DESCRIPTION

In the present invention, each time a PCRF sends event triggers of a UE to a BBERF, the event triggers include all event triggers of a gateway control session related to the UE (i.e., each IP-CAN session related to the UE). After receiving event triggers, the BBERF deletes the previous provided event triggers and installs the newly provisioned event triggers. In other words, the BBERF only maintains latest event triggers for each UE. Different from the prior art the prior art in which provisioning and installing/updating event triggers are based on the IP-CAN level, provisioning and installing/updating event triggers in the present invention are based on the UE level. Since a UE only has one gateway control session, it may also be regarded that provisioning and installing/updating event triggers in the present invention are based on the gateway control session level.

Hereinafter, the present invention will be further illustrated with reference to the drawings and exemplary embodiments, so that the skilled in the art may better understand and implement the present invention, while the embodiments as provided do not constitute a limitation to the present invention.

Since what is concerned in the present invention is provisioning and installing event triggers, content about setting, provisioning and installing a QoS rule and a PCC rule is omitted in the flows of the following embodiment.

Figure 1:
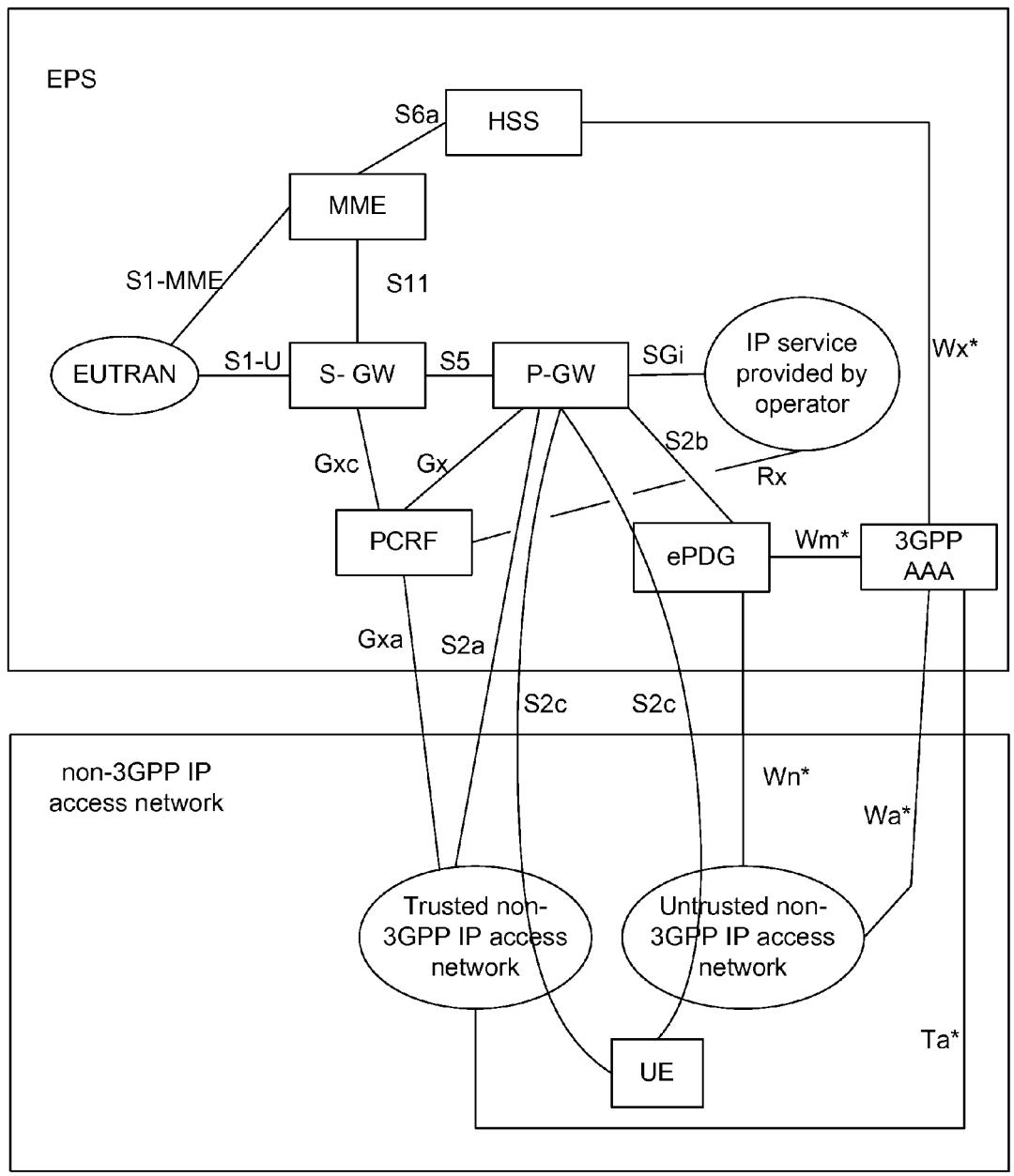
FIG. 1 is an architecture diagram of a 3GPP EPS in a non-roaming state.
Figure 2:
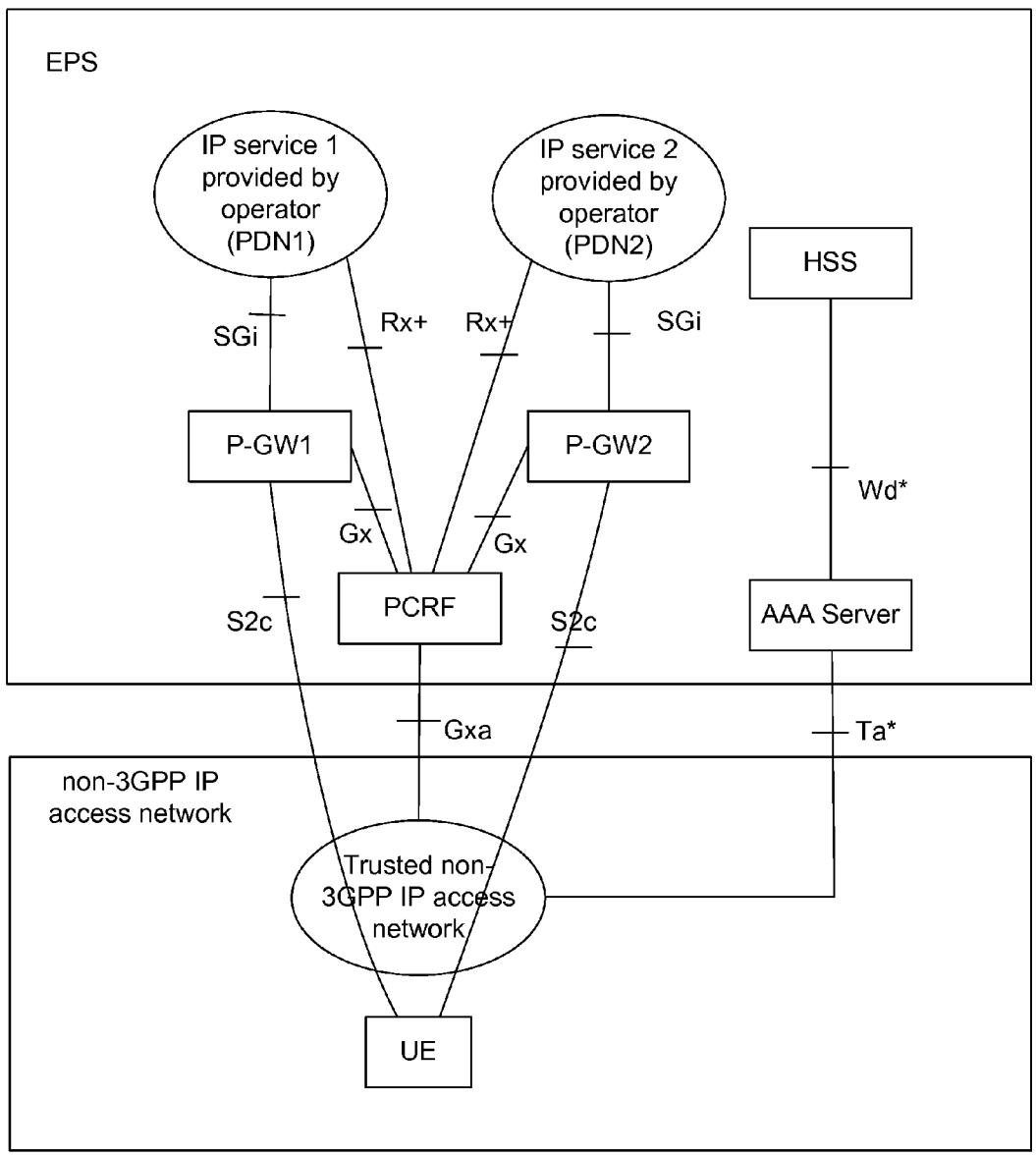
FIG. 2 is a diagram of a UE accessing different service networks through different P-GWs.
Figure 3:
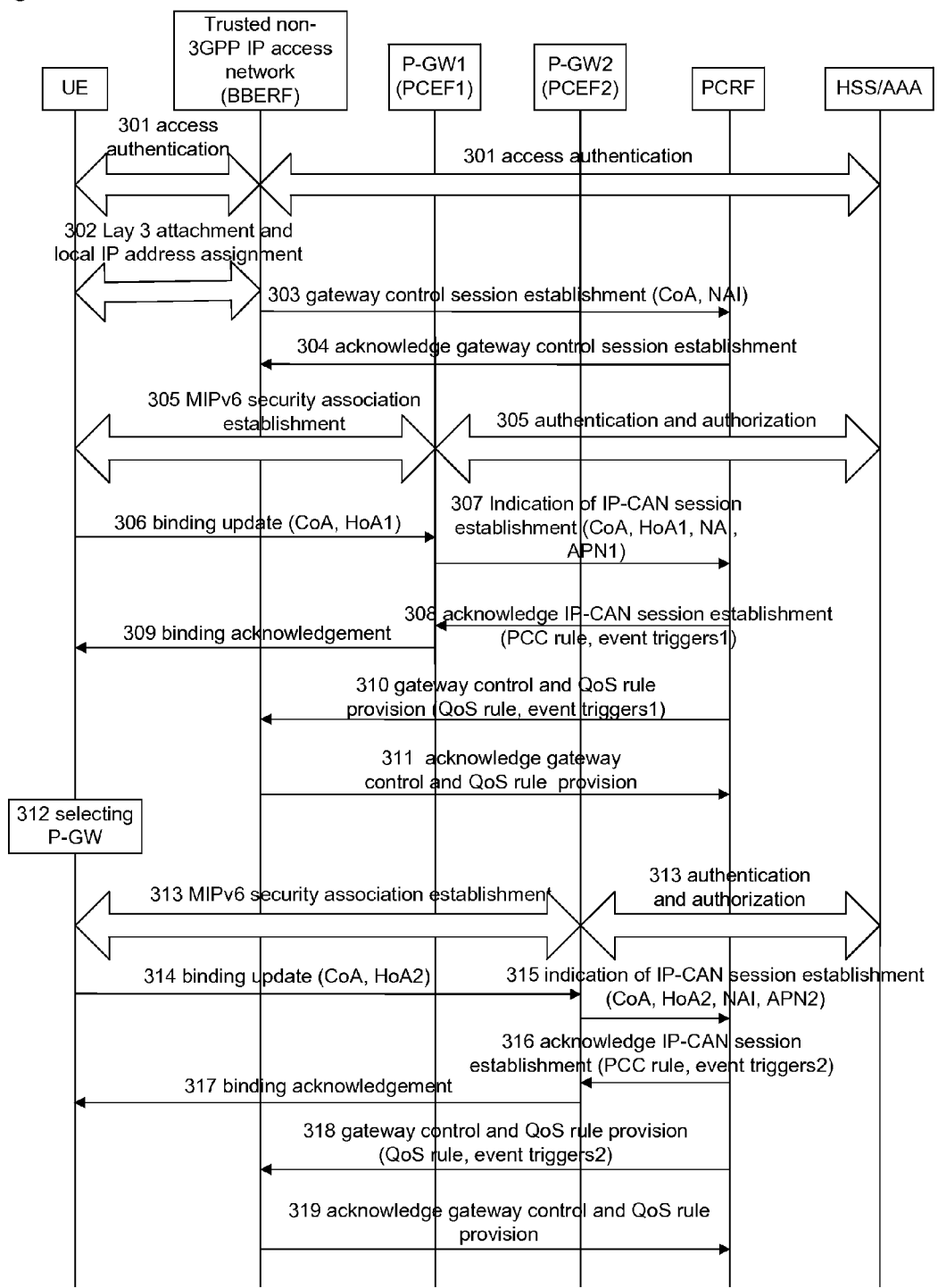
FIG. 3 is an attachment flowchart of a UE accessing different service networks through different P-GWs in the prior art.
Figure 4:
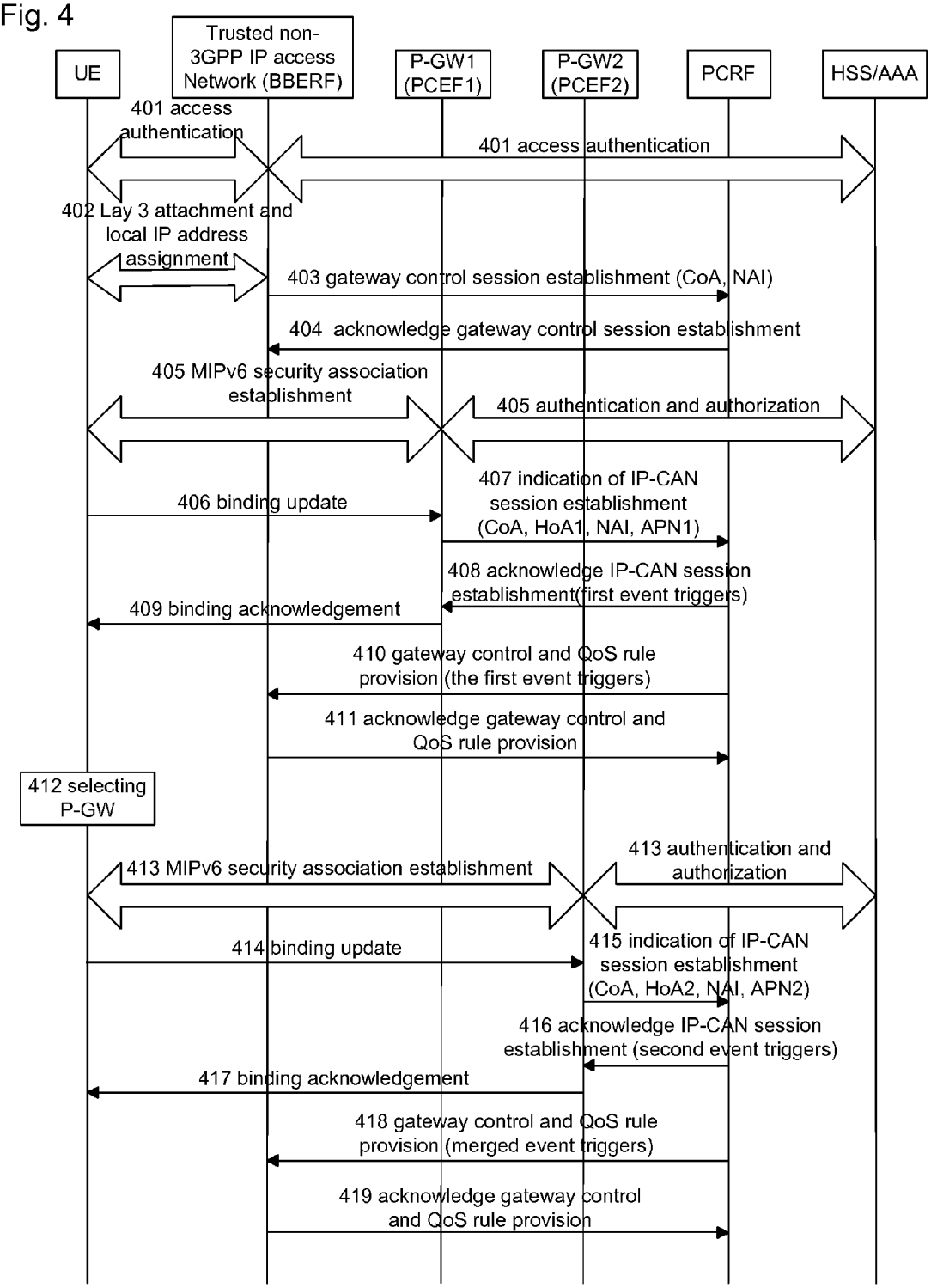
FIG. 4 is an attachment flowchart of a UE accessing different service networks through different P-GWs according to an embodiment of the present invention.

This embodiment is based on the scenario as shown in FIG. 2. As shown in FIG. 4, in this embodiment, a UE accesses different service networks through different P-GWs and interacts with the P-GW according to the DSMIPv6, and the flow for the UE attaching and assessing two PDNs comprises the following steps.

Step 401: the UE accesses a trusted non-3GPP access network via layer 2, and an HSS/AAA performs access authentication and authorization to the UE.

Step 402: after the authentication is successful, a connection of the UE to layer 3 of the trusted non-3GPP access system is established; the access system assigns a local IP address to the UE as a CoA of the UE.

Step 403: the trusted non-3GPP access network where a BBERF resides sends a gateway control session establishment message to a PCRF, and the message includes an NAI of the UE and the CoA of the UE.

Step 404: the PCRF sets a control policy based on a network policy and subscription information of the UE, and provisions it to the BBERF in the trusted non-3GPP access network through an acknowledge gateway control session establishment message, and the control policy here has no relation to the service which is the UE is about to access.

Step 405: the UE queries a DNS according to an APN 1 to obtain an IP address of a P-GW1 capable of accessing a first service network. A security association is established between the UE and the P-GW1, and during this process the P-GW1 assigns an HoA1 to the UE.

Step 406: the UE sends a binding update request message to the P-GW1, and the message includes the CoA and the HoA 1.

Step 407: the P-GW1 sends an indication of IP-CAN session establishment message to the PCRF, and the message includes the CoA, HoA1, NAI, and APN1; and the PCRF associates the IP-CAN session with the gateway control session of the UE according to the CoA.

Step 408: the PCRF, according to the network policy, user subscription information and information about the first service network to be accessed, etc., sets first event triggers, and sends the first event triggers to the P-GW1 via an acknowledge IP-CAN session establishment message.

Step 409: a PCEF in the P-GW1 installs the first event triggers provisioned by the PCRF, and returns a binding acknowledgement message to the UE.

Step 410: the PCRF provisions the first event triggers to the BBERF in the trusted non-3GPP access network via a gateway control and QoS rule provision message.

Step 411: the BBERF in the trusted non-3GPP access network installs the first event triggers, and returns an acknowledge gateway control and QoS rule provision message to the PCRF.

Till now, the UE attachment flow is complete, and an IP-CAN session to a PDN1 is established.

Step 412: because of service requirement, the UE determines to access a second service network, and queries the DNS according to an APN2 to obtain an IP address of a P-GW2 capable of accessing the second service network.

Step 413: a security association is established between the UE and the P-GW2, during this process the P-GW2 assigns an HoA2 to the UE.

Step 414: the UE sends a binding update request message to the P-GW2, and the message includes the CoA and the HoA2.

Step 415: the P-GW2 sends an indication of IP-CAN session establishment message to the PCRF, and the message includes the CoA, HoA2, NAI and APN2; and the PCRF associates the IP-CAN session with the gateway control session of the UE according to the CoA.

Step 416: the PCRF, according to the network policy, user subscription information and information about the second service network to be accessed, etc., sets second event triggers, and sends the second event triggers to the P-GW2 via an acknowledge IP-CAN session establishment message.

Step 417: a PCEF in the P-GW2 installs the second event triggers provisioned by the PCRF, and returns a binding acknowledgement message to the UE.

The above-mentioned steps are identical to the processing in the prior art.

Step 418: the PCRF merges the first event triggers set for a first IP-CAN session with the second event triggers set for a second IP-CAN session to form merged event triggers comprising all event triggers of the first and second IP-CAN sessions, and provisions them to the BBERF in the trusted non-3GPP access network through a gateway control and QoS rule provision message. Since the first and second IP-CAN sessions of the UE share one gateway control session, the merged event triggers of the event triggers of the first and second IP-CAN sessions may also be regarded as event triggers of this gateway control session (Gxx session), i.e., the event triggers provisioned by the PCRF are based on the gateway control session level, rather than the IP-CAN session level.

Step 419: the trusted non-3GPP access network deletes the first event triggers, installs the merged event triggers, and returns an acknowledge gateway control and QoS rule provision message to the PCRF.

In another embodiment, in step 418, it should be firstly determined whether the event triggers in the first event triggers are completely identical to those in the second event triggers, or whether the merged event triggers are identical to the first event triggers, if yes, the merged event triggers are not provisioned. Correspondingly, it would be unnecessary to implement step 419. In other words, in the present invention event triggers comprising all current event triggers only needs to be provisioned when a set of all event triggers of each IP-CAN session related to the UE changes. Specific embodiments here are not limited in the present invention.

The UE may also access a third service network, then the PCRF sets third event triggers for a third IP-CAN session, merges the third event triggers with the first event triggers and the second event triggers, and provisions the merged event triggers to the BBERF. The specific flow is similar. The scenario of accessing a forth or more service network is also similar.

Figure 5:
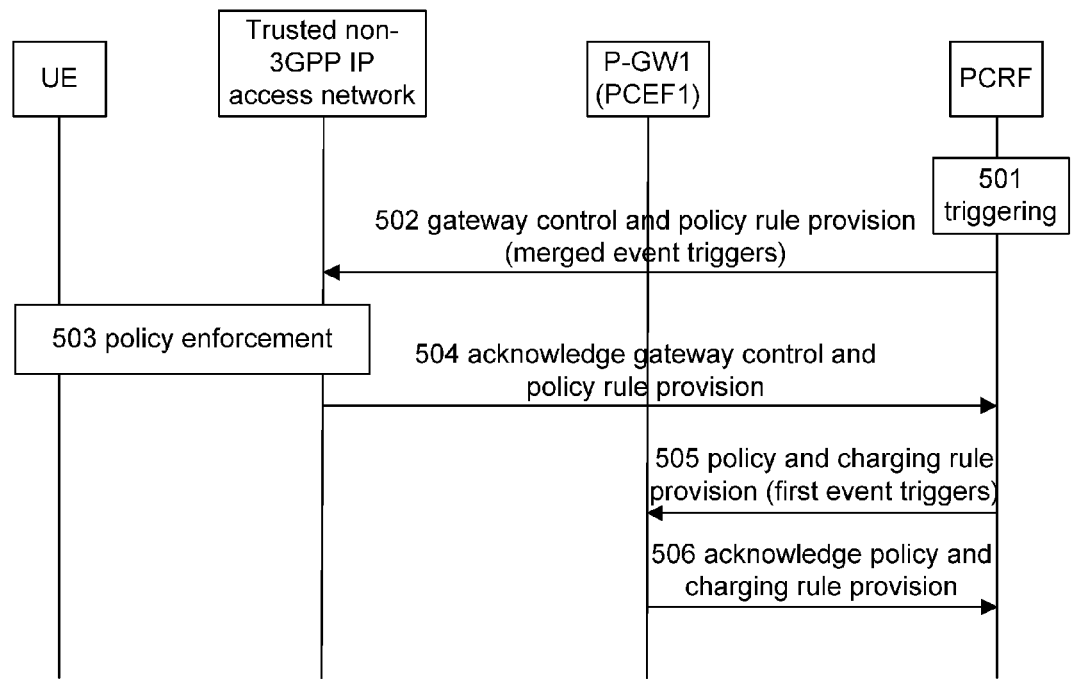
FIG. 5 is a flowchart of updating policy control when the network policy changes after the UE establishes IP connections to a first service network and a second service network according to an embodiment of the present invention.

When the UE establishes IP connection to the first service network and IP connection to the second service network through the above-mentioned steps, if service information of the first service network, the network policy of EPS or user subscription information changes, or under other circumstances, the PCRF needs to update policy control information related to the first IP-CAN session. The flow of updating is shown in FIG. 5, and each step is described below.

Step 501: when the service information of the first service network, the network policy of the EPS or user subscription information changes, the PCRF updates the previous policy control information related to the first IP-CAN session, here it is assumed that the first event triggers are updated.

Step 502: the PCRF merges the updated first event triggers with the stored second event triggers to form merged event triggers comprising all event triggers of the first IP-CAN session and the second IP-CAN session, and provisions them to the BBERF in the trusted non-3GPP access network through a gateway control and policy rule provision message. Likewise, since the first and second IP-CAN sessions of the UE share one gateway control session, the merged event triggers of the event triggers of the first and second IP-CAN sessions may also be regarded as event triggers of this gateway control session (Gxx session), i.e., the event triggers provisioned by the PCRF are based on the gateway control session level, rather than the IP-CAN session level.

Step 503: the UE and the trusted non-3GPP IP access network perform the newly provisioned policy.

Step 504: the BBERF in the trusted non-3GPP access network deletes the installed event triggers, installs the merged event triggers which are newly provisioned, and returns an acknowledge gateway control and policy rule provision message to the PCRF.

Step 505: the PCRF provisions the updated first event triggers to the P-GW1 is through a policy and charging rule provision message.

Step 506: the P-GW1 updates the first event triggers and returns an acknowledge policy and charging rule provision message to the PCRF.

In the above-mentioned steps 502 and 505, after the PCRF updates the event triggers, if assignment of resources in step 503 does not require updating the PCC rule in the PCEF, there would be no fixed order between the operation of provisioning to the trusted non-3GPP access network and the operation of provisioning to the P-GW1. It is also similar in other embodiments.

In another embodiment, if service information of the second service network, the network policy of EPS or user subscription information changes, the PCRF needs to update policy control information related to the second IP-CAN session and update the second event triggers, and the PCRF merges the updated second event triggers with the stored first event triggers to form merged event triggers comprising all event triggers of the first IP-CAN session and the second IP-CAN session, and provisions them to the BBERF in the trusted non-3GPP access network through a gateway control and policy rule provision message; and the BBERF deletes the installed event triggers and installs the merged event triggers which are newly provisioned.

Figure 6:
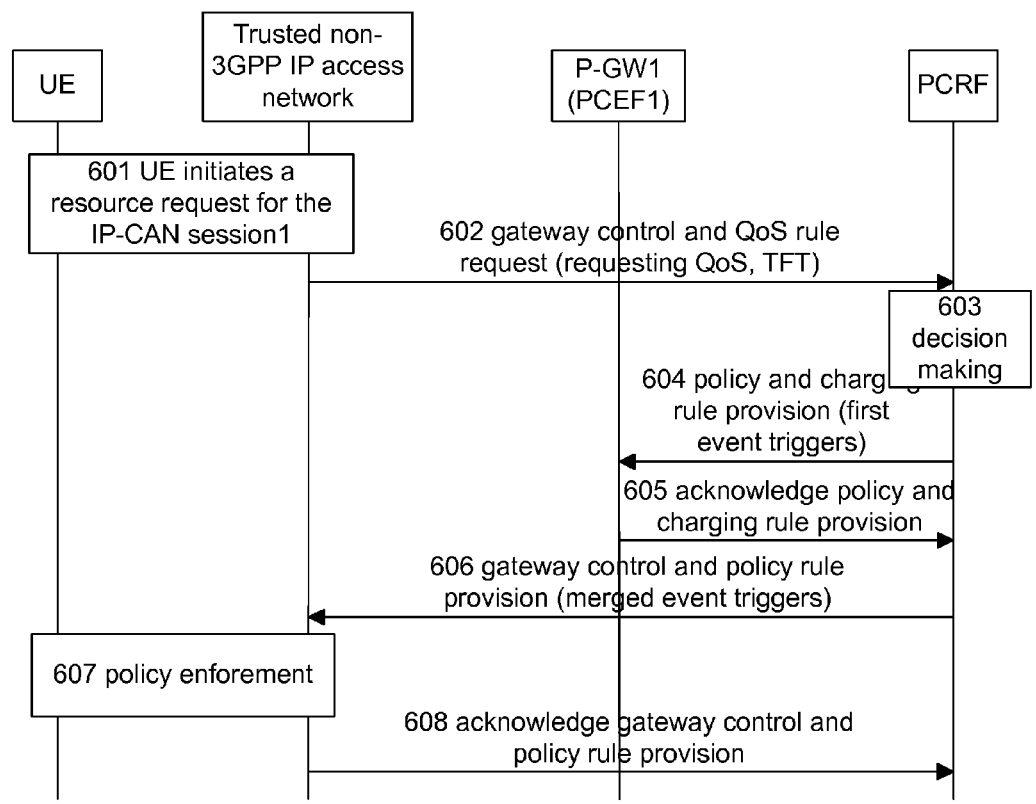
FIG. 6 is a flowchart of updating policy control when the UE initiates a new resource assignment request to a first service network after the UE establishes IP connection to a first service network and IP connection to a second service network according to an embodiment of the present invention.

After the UE establishes IP connection to the first service network and IP connection to the second service network according to the flow in FIG. 4, if the UE initiates a new resource request to the first service network, the PCRF needs to reset first event triggers so that the PCRF is to update event triggers related to the first IP-CAN session in the trusted non-3 GPP access network. The flow of updating is shown in FIG. 6, and each step is described below.

Step 601: the trusted non-3GPP access network receives a resource request for the first IP-CAN session initiated from the UE.

Step 602: the trusted non-3GPP access network sends a gateway control and QoS policy rule request message to the PCRF, and the message includes the requested QoS and a TFT (Traffic Flow Template).

Step 603: the PCRF sets new first event triggers according to the request message.

Step 604: the PCRF sends a policy and charging rule provision message to the P-GW1, and the message includes the updated first event triggers.

is Step 605: the P-GW1 installs the updated first event triggers and returns an acknowledge policy and charging rule provision message.

Step 606: the PCRF merges the updated first event triggers with the stored second event triggers to form merged event triggers comprising all event triggers of the first IP-CAN session and the second IP-CAN session, and provisions them to the BBERF in the trusted non-3GPP access network through a gateway control and policy rule provision message. Likewise, since the first and second IP-CAN sessions of the UE share one gateway control session, the merged event triggers of the event triggers of the first and second IP-CAN sessions may also be regarded as event triggers of this gateway control session (Gxx session), i.e., the event triggers provisioned by the PCRF are based on the gateway control session level, rather than the IP-CAN session level.

Step 607: the UE and the trusted non-3GPP IP access network perform the newly provisioned policy.

Step 608: the BBERF in the trusted non-3GPP access network deletes the installed event triggers, installs the merged event triggers which are newly provisioned, and returns an acknowledge gateway control and policy rule provision message to the PCRF.

In another embodiment, if the UE initiates a new resource request to the second service network, the PCRF needs to reset second event triggers so that the PCRF updates the second event triggers. Then, the updated second event triggers and the stored first event triggers are merged to form merged event triggers comprising all event triggers of the first IP-CAN session and the second IP-CAN session, and the merged event triggers are provisioned to the BBERF in the trusted non-3GPP access network through a gateway control and policy rule provision message; the BBERF deletes the installed event triggers and installs the merged event triggers which are newly provisioned.

After updating event triggers of an IP-CAN session of a UE, the PCRF may firstly determine whether the event triggers in the updated event triggers are all included in event triggers of other IP-CAN sessions related to the UE; if no, the updated event triggers and the event triggers of other IP-CAN sessions related to the UE are merged to form merged event triggers comprising all event triggers of each IP-CAN session related is to the UE, and the merged event triggers are provisioned to the BBERF; and if yes, it would be unnecessary to provision the event triggers to the BBERF, and the flow ends.

Correspondingly, an EPS of the present invention includes a PCRF and a BBERF, wherein the PCRF is used for setting all event triggers information of each IP-CAN session related to a UE into event triggers, each time the PCRF provisions the event triggers of the UE to the BBERF.

the BBERF is used for installing or updating the event triggers after receiving the provisioned event triggers.

The specific provisioning manners adopted by the PCRF mainly comprise:

after setting and provisioning first event triggers for the UE and when setting new event triggers, the PCRF directly merges each event trigger related to the UE to form merged event triggers comprising all event triggers of each IP-CAN session related to the UE, and then provisions the merged event triggers to the BBERF; or when setting the new event triggers of the IP-CAN session, the PCRF firstly determines whether event triggers in the newly set event triggers are all included in event triggers of other IP-CAN sessions related to the UE; if no, the operations of merging and provisioning are further performed; and if yes, it is unnecessary to provision the event triggers.

After updating event triggers of an IP-CAN session of the UE, The PCRF directly merges the updated event triggers with event triggers of other IP-CAN sessions related to the UE to form merged event triggers comprising all event triggers of each IP-CAN session related to the UE, and then provisions the merged event triggers to the BBERF; or after updating the event triggers of the IP-CAN session, the PCRF firstly determines whether the event triggers in the updated event triggers are all included in event triggers of other IP-CAN sessions related to the UE; if no, the operations of merging and provisioning are further performed; and if yes, it is unnecessary to provision the event triggers.

The above-mentioned embodiments are only preferred embodiments for sufficiently illustrating the present invention, and thus the protection scope of the present invention is not limited thereto. All equivalent alternatives or alterations made by the skilled in the art on the basis of the present invention are all in the protection scope of the present invention. The protection scope of the present invention is subject to the claims.

For example, though all of the above-mentioned embodiments are based on the access scenario in FIG. 2, the present solution is likewise suitable for a scenario of a UE accessing multiple PDNs via one P-GW. Under this scenario, the operations of updating, provisioning, and installing event triggers between the PCRF and BBERF may adopt the method in the above-mentioned flow.

For another example, the present solution is likewise suitable for a scenario of a UE accessing more than two PDNs. Ander this scenario, the operations of updating, provisioning, and installing event triggers between the PCRF and BBERF may follow the following solution: each time event triggers of the UE are provisioned to the BBERF, the event triggers include all event triggers of gateway control sessions (i.e., each IP-CAN session related to the UE) related to the UE.

Further, a BBERF may also exist in an ePDG, and a same problem also occurs in provisioning and installing event triggers between the PCRF and the BBERF. Though scenarios causing updating and provisioning of event triggers may be different, the reason causing this problem is that there is only one channel between the PCRF and the BBERF, thus the BBERF cannot distinguish to which IP-CAN session event triggers are related, therefore, operations of updating, provisioning and installing event triggers between the PCRF and BBERF in the above-mentioned flow may also be used to solve the existing technical problem.

Industrial Applicability

The present invention provides a method for provisioning and installing event triggers and a corresponding evolved packet system. The PCRF, based on gateway control session level, provisions event triggers composed of all event triggers of a UE to the BBERF, so that the BBERF can correctly report trigger events so as to perform correct policy control to the service data flow.

What is claimed is:

1. A method for provisioning and installing event triggers, which is applied to an evolved packet system, comprising:
   a policy and charging rules function entity (PCRF) provisioning event triggers to a bearer binding and event reporting function entity (BBERF) based on gateway control session level;
   after receiving the provisioned event triggers, the BBERF installing or updating the event triggers;
   wherein the event triggers comprise all event triggers of all IP connectivity access network sessions (IP-CAN sessions) of a user equipment, which share one gateway control session.

2. The method for provisioning and installing event triggers according to claim 1, wherein before the PCRF provisions the event triggers to the BBERF, the method further comprising: the user equipment interacting with a packet data network gateway (P-GW) according to a dual stack mobile Ipv6 (DSMIPv6), and accessing different service networks through different P-GWs or one P-GW.

3. The method for provisioning and installing event triggers according to claim 2, wherein
   when the user equipment performs attachment, the PCRF sets event triggers for a first IP-CAN session of the user equipment and provisions them to the BBERF; and
   after the user equipment attachment is complete and when a new IP-CAN session is established, the PCRF sets event triggers for the newly established IP-CAN session, and merges the newly set event triggers with event triggers of other IP-CAN sessions related to the user equipment to form merged event triggers comprising all event triggers of each IP-CAN session related to the user equipment, and then provisions the merged event triggers to the BBERF.

4. The method for provisioning and installing event triggers according to claim 2, wherein
   when the user equipment performs attachment, the PCRF set event triggers for a first IP-CAN session of the user equipment and provisions them to the BBERF;
   after the user equipment attachment is complete and when a new IP-CAN session is established, the PCRF sets event triggers for the newly established IP-CAN session, and then determines whether event triggers in the newly set event triggers are all included in event triggers of other IP-CAN sessions related to the user equipment; if yes, the PCRF need not provision the event triggers to the BBERF; if no, the PCRF merges the newly set event triggers with event triggers of other IP-CAN sessions related to the user equipment to form merged event triggers comprising all event triggers of each IP-CAN session related to the user equipment, and then provisions the merged event triggers to the BBERF.

5. The method for provisioning and installing event triggers according to claim 2, wherein
   after updating event triggers of an IP-CAN session of the user equipment, the PCRF merges the updated event triggers with event triggers of other IP-CAN sessions related to the user equipment to form merged event triggers comprising all event triggers of each IP-CAN session related to the user equipment, and provisions the merged event triggers to the BBERF.

6. The method for provisioning and installing event triggers according to claim 2, wherein
   after updating event triggers of an IP-CAN session of the user equipment, the PCRF firstly determines whether event triggers in the updated event triggers are all included in event triggers of other IP-CAN sessions related to the user equipment; if yes, the PCRF need not provision the event triggers to the BBERF; if no, the PCRF merges the updated event triggers and event triggers of other IP-CAN sessions related to the user equipment to form merged event triggers comprising all event triggers of each IP-CAN session related to the user equipment, and then provisions the merged event triggers to the BBERF.

7. An evolved packet system, comprising a PCRF and a BBERF, wherein
   the PCRF is used for setting all event trigger information of each IP-CAN session related to a user equipment into event triggers, each time the PCRF provisions the event triggers to the BBERF based on gateway control session level;
   the BBERF is used for installing or updating the event triggers after receiving the provisioned event triggers;
   wherein the event triggers comprise all event triggers of all IP-CAN sessions of the user equipment, which share one gateway control session.

8. The evolved packet system according to claim 7, wherein
   after setting and provisioning first event triggers for the user equipment and when setting new event triggers, the PCRF directly merges each event trigger related to the user equipment to form merged event triggers comprising all event triggers of each IP-CAN session related to the user equipment, and then provisions the merged event triggers to the BBERF; or when setting new event triggers of an IP-CAN session, the PCRF firstly determines whether event triggers in the newly set event triggers are all included in event triggers of other IP-CAN sessions related to the user equipment; if no, the operations of merging and provisioning are further performed; and if yes, it is unnecessary to provision the event triggers.

9. The evolved packet system according to claim 7, wherein
   after updating event triggers of an IP-CAN session of the user equipment, the PCRF directly merges the updated event triggers with event triggers of other IP-CAN sessions related to the user equipment to form merged event triggers comprising all event triggers of each IP-CAN session related to the user equipment, and then provisions the merged event triggers to the BBERF; or after updating the event triggers of the IP-CAN session, the PCRF firstly determines whether the event triggers in the updated event triggers are all included in event triggers of other IP-CAN sessions related to the user equipment; if no, the operations of merging and provisioning are further performed; and if yes, it is unnecessary to provision the event triggers.

10. The evolved packet system according to claim 8, wherein
    after updating event triggers of an IP-CAN session of the user equipment, the PCRF directly merges the updated event triggers with event triggers of other IP-CAN sessions related to the user equipment to form merged event triggers comprising all event triggers of each IP-CAN session related to the user equipment, and then provisions the merged event triggers to the BBERF; or after updating the event triggers of the IP-CAN session, the PCRF firstly determines whether the event triggers in the updated event triggers are all included in event triggers of other IP-CAN sessions related to the user equipment; if no, the operations of merging and provisioning are further performed; and if yes, it is unnecessary to provision the event triggers.

* * * * *

UNITED STATES PATENT AND TRADEMARK OFFICE
CERTIFICATE OF CORRECTION

PATENT NO.      : 8,463,889 B2  
APPLICATION NO. : 13/003972  
DATED           : June 11, 2013  
INVENTOR(S)     : Zhou et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 211 days.

Signed and Sealed this
Eighth Day of September, 2015

Michelle K. Lee
*Director of the United States Patent and Trademark Office*